United States Patent [19]

Inuzuka et al.

[11] Patent Number: 5,812,274
[45] Date of Patent: *Sep. 22, 1998

[54] IMAGE SIGNAL PROCESSING APPARATUS

[75] Inventors: Tatsuki Inuzuka; Toshiaki Nakamura; Shinichi Shinoda; Yasuyuki Kojima, all of Hitachi, Japan

[73] Assignee: Hitachi, Ltd., Tokyo, Japan

[*] Notice: The term of this patent shall not extend beyond the expiration date of Pat. No. 5,555,095.

[21] Appl. No.: 656,874

[22] Filed: May 30, 1996

Related U.S. Application Data

[63] Continuation of Ser. No. 34,388, Mar. 18, 1993, Pat. No. 5,555,095.

[30] Foreign Application Priority Data

Mar. 19, 1992 [JP] Japan ................................. 4-063270

[51] Int. Cl.$^6$ ........................... G02B 26/08; G03B 21/56
[52] U.S. Cl. ........................................... 358/298; 358/443
[58] Field of Search ............................ 358/296, 298, 358/456, 458, 461, 465, 466, 448, 443, 444; 395/115, 116

[56] References Cited

U.S. PATENT DOCUMENTS

| | | | |
|---|---|---|---|
| 5,091,965 | 2/1992 | Kobayashi et al. | 382/15 X |
| 5,130,822 | 7/1992 | Nagata et al. | 358/461 |
| 5,262,873 | 11/1993 | Ishizuka | 358/443 |
| 5,555,095 | 9/1996 | Inuzuka et al. | 358/298 |

Primary Examiner—Peter S. Wong
Assistant Examiner—Patrick B. Law
Attorney, Agent, or Firm—Antonelli, Terry, Stout, & Kraus, LLP

[57] ABSTRACT

An image signal processing apparatus to realize signal processing system and apparatus constitution, where an image signal inputted using a photoelectric conversion element such as a CCD or a contact type image sensor is obtained in circuit constitution of small scale with high picture quality. In order to solve the problems, data width of a signal referred to in a shading corrector, an MTF corrector and an error diffusion circuit is made $b+f+j \leq 8$ per one pixel. Or error component commonly possessed by plural pixels (N pixels) in the error diffusion circuit is made $b+f+j' \leq 8$, data width per one pixel being made $j'=j/N$. Image signal processing is realized in this constitution, thereby data width of a signal referred to in respective signal processings is reduced, and an image signal satisfying accuracy of signal processing sufficiently and having high picture quality can be obtained. For example, when a circuit is constituted by LSI, the memory section can be easily mounted on the same LSI. A memory required in the image signal processing can be made 8 bits per one pixel and a cheap memory constitution can be utilized.

16 Claims, 8 Drawing Sheets

IMAGE SIGNAL PROCESSING APPARATUS

This is a continuation of application Ser. No. 08/034,388, filed Mar. 18, 1993 now U.S. Pat. No. 5,555,095.

BACKGROUND OF THE INVENTION

The present invention relates to an image signal processing apparatus, such as a scanner for inputting image signals.

In the prior art, image signal processing is carried out in such a way that an image signal inputted using a photoelectric conversion element, for example, a CCD (charge coupled device) or a contact type image sensor, is converted into a signal capable of storage, transmission or the like. An example of this signal processing is described as follows, where various functional parts in the prior art relating to the image signal processing are considered.

(1) Regarding shading correction, a problem exists in the prior art in that an image signal inputted using a photoelectric conversion element, such as a CCD (charge coupled device) or a contact type image sensor, includes distortion components, such as unevenness of illumination or characteristic dispersion of each photoelectric conversion element. Consequently, shading correction is carried out in order that this distortion is corrected and a uniform image signal is reproduced.

(2) Also regarding MTF correction, in order that the MTF characteristic possessed by an optical system or a sensor will be corrected and a further edge characteristic (undulled characteristic of edge shape of wave form) will be improved, MTF correction processing is carried out.

(3) Further, regarding a pseudo-half-tone section, in order that a half-tone image obtained in a printer of black-and-white recording will be reproduced as a dummy, a signal processing method called error diffusion is carried out.

In addition to those processes described above, in usual apparatuses, γ-processing for carrying out level conversion of an input signal, binarization for outputting a document image signal, signal processing for separating a half-tone image area of a photograph or the like and a black-and-white binary image area of a document image or the like, and other various processings have been proposed.

For example, in the prior art, respective means for realizing signal processing and memories for storing data are constituted individually. In such a constitution, however, there are problems in that, since a plurality of memory interfaces are required in the apparatus as a whole and the circuit scale is increased and the apparatus is operated only by an independent function in each memory, a mutual function between memories cannot be achieved, and further an unused portion is produced in the memory, and so the apparatus constitution becomes disadvantageous.

That is, an apparatus in the prior art, as shown in FIG. 1, is constituted by a signal processing section I comprising a sensor 1, an A/D converter 2, a shading corrector 3, a γ-corrector 4, an MTF corrector 5, a binarization circuit 6, an error diffusion circuit 7, a signal output circuit 8 and its output 9, and structures entirely separated from the signal processing section I (so-called "external structures") where a first memory section II, a second memory section III, a third memory section IV and the like (comprising a memory 10, a memory 11, a memory 12 and the like) are separated from each other.

Respective memory sections are constituted by memories 10–12, each comprising N bit/pixel; in this case, assuming that N=8, the memories each comprise 8 bit/pixel, and such case is effective since standard memories can be utilized.

In the constitution shown in FIG. 1, however, since three structures each comprising 8 bits are installed separately from the signal processing section I and are independent of each other, individual memory interfaces are required as above described, and further problems concerning increase in required number of parts, an increase of trouble in the treatment due to complication of the wiring connecting respective parts, a decrease in the reliability and life due to the complexity of each circuit and the large number of parts, the large scale of the apparatus, and an increase in the price and degradation of the reliability cannot be avoided.

SUMMARY OF THE INVENTION

An object of the present invention is to provide an image signal processing apparatus to realize a signal processing system and apparatus [constitution], where, for example, parts comprising [a] sensor 1 [–a] to signal output circuit 8 and a line memory are constituted as one body, as shown in FIG. 2 and FIG. 3, so as to obtain an image signal inputted using a photoelectric conversion element such as a CCD or a contact type image sensor in circuit [constitution] of small scale with a high picture quality.

In order to solve the above-mentioned problems, the data width of a signal referred to in a shading corrector, an MTF corrector and an error diffusion circuit is set as $b+f+j \leq 8$ per one pixel, respectively.

Or, the error component commonly possessed by plural pixels (N pixels) in the error diffusion circuit is set to $b+f+j' \leq$ the data width per one pixel being made $j'=j/N$.

Image signal processing is realized in the above-mentioned constitution, whereby the data width of a signal referred to in respective signal processings is reduced, and an image signal satisfying the accuracy of signal processing sufficiently and having a high picture quality can be obtained. For example, when a circuit is constituted by an LSI, the memory section can be easily mounted on the same LSI.

The apparatus has the effect that a memory required in the image signal processing can be made 8 bits per one pixel and a cheap memory constitution can be utilized.

DESCRIPTION OF THE PREFERRED EMBODIMENTS

Figure 1:
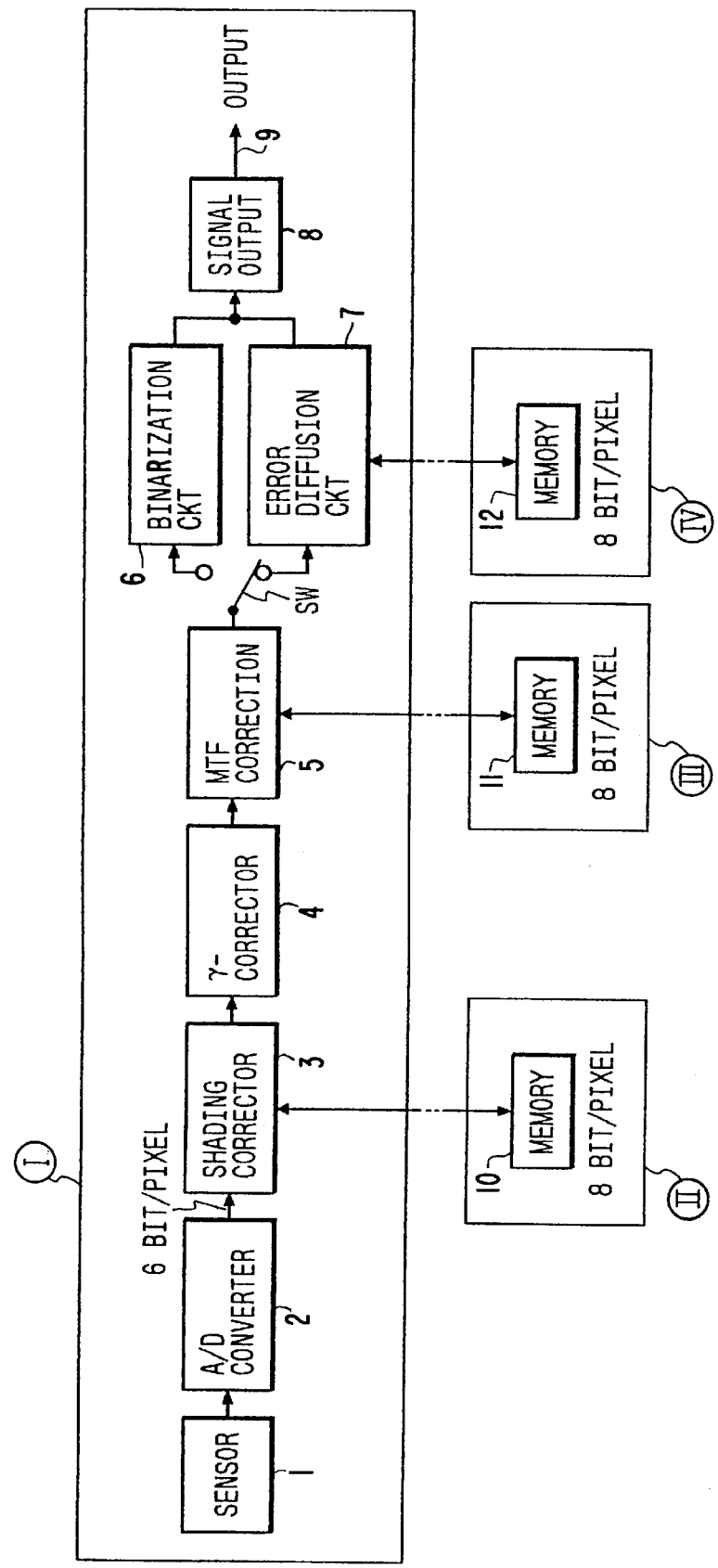
FIG. 1 is a schematic block diagram showing the whole constitution of an apparatus in the prior art comprising a signal processing section and a plurality of memory sections which are independent of the signal processing section respectively.
Figure 2:
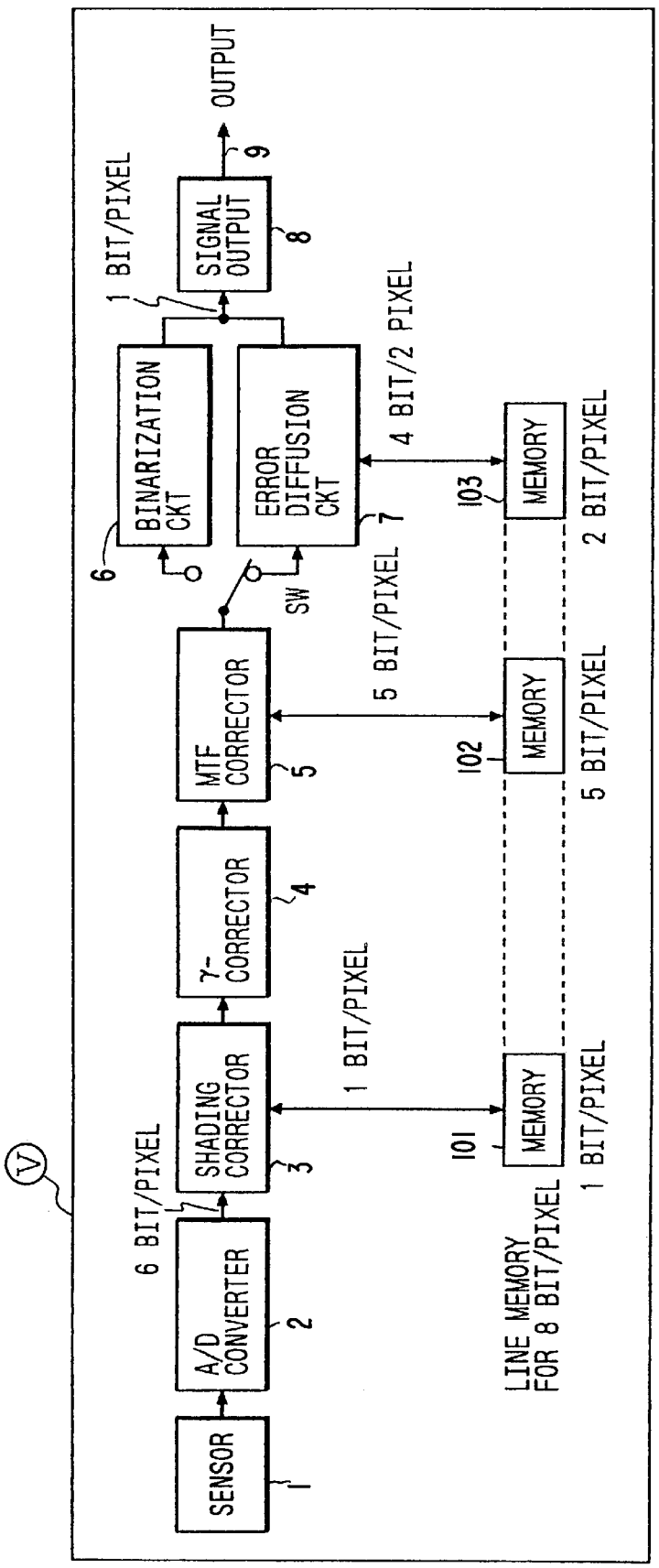
FIG. 2 and FIG. 3 are block diagrams showing different embodiments of the invention, respectively.

Considering the above-mentioned problems in the prior art, the present invention provides an apparatus as shown in FIG. 2, where a signal processing section V has a shading corrector 3, an MTF corrector 5 and an error diffusion circuit 7, and memory parts, formed as a whole in 8 bits for example and constituted by memories 101, 102 and 103, are provided integrally with the shading corrector 3, the MTF corrector 5 and the error diffusion circuit 7, respectively, and are installed quite closely to positions in which the shading corrector 3, the MTF corrector 5 and the error diffusion circuit 7 are fixed.

In the prior art, since the image signal processing section and the memory parts are constituted separately, a disadvantage occurs as above described. On the contrary, in the apparatus of the present invention, for example, one memory is provided for one pixel and 8 bits. Consequently, in comparison with the prior art, the apparatus of the present invention has a small size and increased function and therefore it is quite efficient. In addition, the apparatus of the present invention has effect of a reduction in the number in parts, an improvement of reliability and a reduction in price, and further it has the feature that the number of parts can be decreased.

Figure 3:
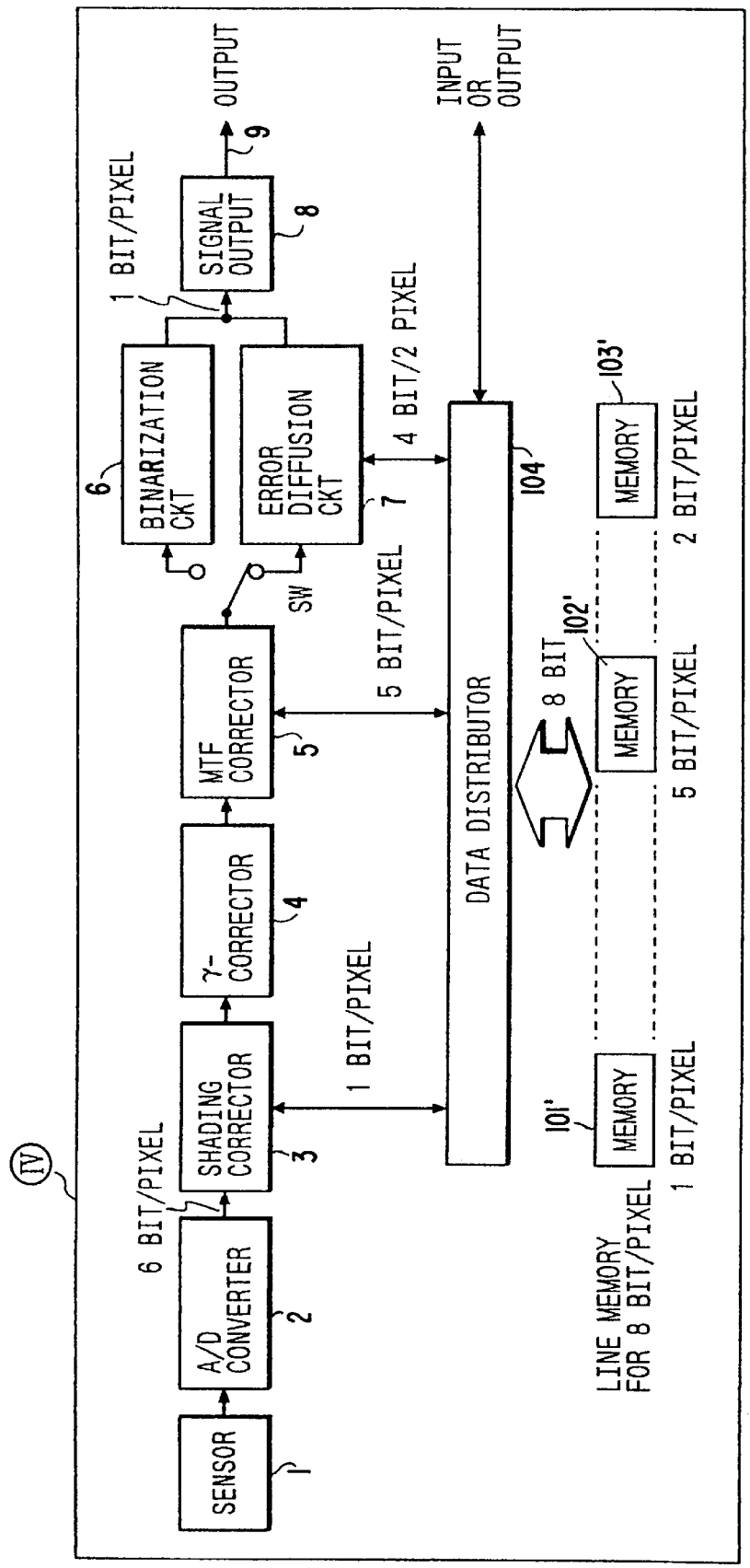

Further, in an apparatus of the present invention as shown in FIG. 3, a data distributor 104, operating as a changing means is provided between a shading corrector 3, an MTF corrector 5 and an error diffusion circuit 7 provided in a signal processing section comprising parts 1–8 for example and memory parts 10', formed as a whole in 8 bits for example and constituted by memories 101', 102' and 103' integrally.

This circuit has the effects as shown in FIG. 2 and also the following effective features as follows.

(1) According to the function of the data distributor 104, memory distribution in the signal processing section comprising parts 1–8 for example can be varied dynamically.

(2) The dynamic distribution can vary the output image in response to changing of the binarization/half tone (error diffusion). This is because signal components used for respective signal processings (binarization, error diffusion) slightly vary.

Further the apparatus has the effective feature that a CPU interface is provided to provide access to an external device such as a CPU, and the memory content can be accessed by soft processing of the CPU.

In addition, regarding the present invention, the following treatment is also effective in solving the problems in the prior art.

That is, the present invention is directed to an image signal processing apparatus for a signal processing system, wherein an image signal inputted using a photoelectric conversion element, such as a CCD or a contact type image sensor, is obtained in a circuit constitution of small scale with high picture quality.

In order to solve the above-mentioned problems, the data width of a signal processed in the shading correction means, the MTF correction means and the error diffusion means is set to b+f+j≦8 per one pixel respectively.

Or, the error component commonly possessed by plural pixels (N pixels) in the error diffusion circuit is set to b+f+j'≦8, the data width per one pixel being j'=j/N.

Image signal processing is realized in the above-mentioned constitution, whereby the data width of a signal referred to in the respective signal processings is reduced, and an image signal satisfying the required accuracy of signal processing sufficiently and having a high picture quality can be obtained. For example, when a circuit is constituted by an LSI, the memory section can be easily mounted on the same LSI.

The apparatus has the effect that a memory required in the image signal processing can be made 8 bits per one pixel and a cheap memory constitution can be utilized.

Further, in accordance with the present invention, in order to solve the above-mentioned problems, the shading correction means 3 estimates an output signal (c bit/pixel) by correction of an image signal (a bit/pixel) using a white reference signal (b bit/pixel), the respective data width being set so that a=c, a>b, and for the white reference signal (b bit/pixel), employs means for compression and expansion of the white reference signal and means for storing the compressed white reference signal (d bit/pixel), each data width being set so that b>d. Finally in the MTF correction means 5 for correcting a noticed image signal (e bit/pixel) using adjacent plural pixel signals (f bit/pixel) and estimating an output signal (g bit/pixel), the respective data width is set so that e≧f; and, in the error diffusion means 7 for estimating a binary output signal (k bit/pixel) based on a predetermined operation procedure, using a noticed pixel signal (i bit/pixel) and an error component (j bit/pixel) before and after the binarization 6, the respective data width is set so that i>j, k=1. Thus, the memory of 8 bits per one pixel is distributed for the error diffusion means, and it follows that d+f+j=8.

Or, the error component commonly possessed by plural pixels (N pixels) is set, and the data width per one pixel is j'=j/N, whereby it follows that d+f+j'=8.

Applying the above-mentioned feature to the shading correction means 3, if it is previously apparent that the signal amplitude range of the reference signal, including the shading distortion, is narrower than the signal amplitude range of the image signal which represents the object of correction, the respective data width is set so that a=c, a>b, whereby a desired accuracy in the operation can be satisfied.

In the white reference signal (b bit/pixel), using means for compression and expansion of the signal and means for storing the compressed white reference signal (d bit/pixel), the respective data width is set so that b>d, whereby the memory capacity can be reduced.

Signal conversion by γ-conversion is carried out on the input signal of the MTF correction means. In the γ-conversion, there is a signal area in which plural steps of an input signal are converted into an output signal of one step, or a signal area in which one step of an input signal is converted into an output signal of plural steps. Consequently, in most of the signal areas, the data width is set so that e>f, whereby a desired accuracy in the operation can be satisfied.

In the error diffusion means, the error component of adjacent plural pixels (N pixels) is calculated by signal processing such as equalization and is utilized in common for the N pixels. Since the signal variation is suppressed by equalization in such a manner, the respective data width can be set so that i>j, k=1.

The image signal processing is realized in the above-mentioned constitution, whereby data width of a signal referred to in respective signal processings is reduced, and also an image signal satisfying the signal accuracy sufficiently and having high a picture quality can be obtained in respective signal processings.

Since the image signal processing is realized in the above-mentioned constitution, the memories used in respective signal processings are combined and timing of data input/output of the memories is the same, and data inputted and outputted at one time is divided and utilized in respective signal processings, whereby the constitution of the apparatus for realizing the image signal processing can be simplified and an image signal of high picture quality can be obtained.

Signals an regarding error component referred to in the error diffusion treatment are commonly possessed and referred to in two pixels, in the case of N (pixel) being made 2, whereby the required memory capacity can be reduced.

The memory capacity required in the image signal processing is reduced, whereby the memory section can be easily assembled in the circuit realizing the image signal processing. For example, when the circuit is constituted by an LSI, the memory section can be easily mounted on the same LSI.

Also the above-mentioned action is obtained, whereby the memory capacity required in all image signal processings can be made 8 bits per one pixel. Since the constitution of the standard memory being widely used carries out signal input/output operations in a unit of 8 bits, the effect is that a standard, hence cheap, memory can be utilized.

Further, an embodiment of the present invention will be shown. Shading correction means 3 inputs a signal from a photoelectric conversion element, such as a CCD or a contact type image sensor, and while a signal is inputted to or received from a memory storing a reference signal for shading correction, the shading correction means 3 outputs a signal after finishing the shading correction.

MTF correction means 5 inputs the signal after the shading correction, and while a signal is inputted to or received from a memory storing an adjacent image signal, the MTF correction means 5 carries out filter treatment based on a previously set coefficient and outputs the signal.

Error diffusion means 7 inputs the signal after finishing the shading correction and signal treatment, such as MTF correction, when a pseudo-tone image is selected, and while a signal is inputted to or received from a memory storing an error component to be distributed to an adjacent pixel, the error diffusion means 7 executes the error diffusion treatment and outputs the signal.

Further, there are a γ-treatment circuit 4 for converting the density characteristic of an image signal and a binarization circuit 6 for deciding whether black-and-white binary image is black or white. The present invention does not depend on details of the signal treatment procedure of the shading correction 3, the MTF correction 5, the γ-treatment 4, the binarization circuit 6 and the like, but signal treatment based on the known principle of these processings will do.

In order to execute the shading correction 3, the MTF correction 5 and the error diffusion 7, a signal storage means corresponding to at least one line is necessary for respective signal treatments.

When the sensor output signal 1 is subjected to A/D conversion and the inputted image signal is 6 bit/pixel, an example will be described where the data width to be used for respective signal processings is limited to the accuracy necessary for the operation, whereby constitution of the signal delay means is that of a memory corresponding to one line of 8 bits per one pixel.

Figure 4:
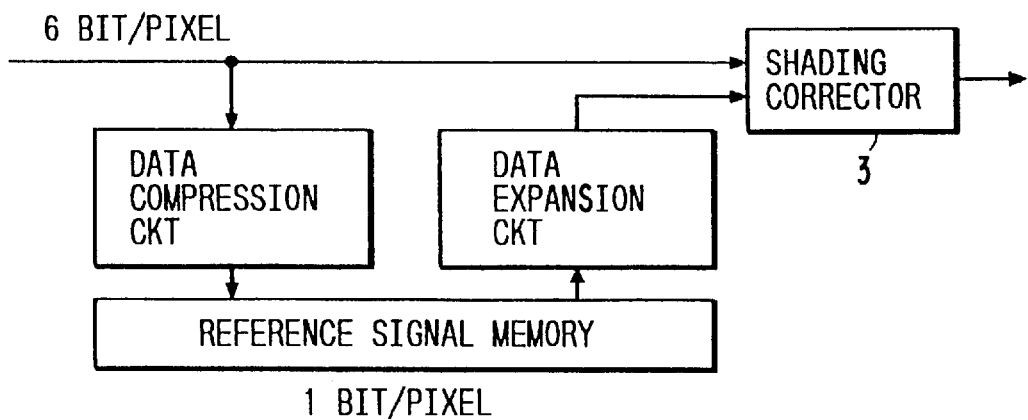
FIG. 4 is a block diagram of shading correction means being one element of the invention.
Figure 5:
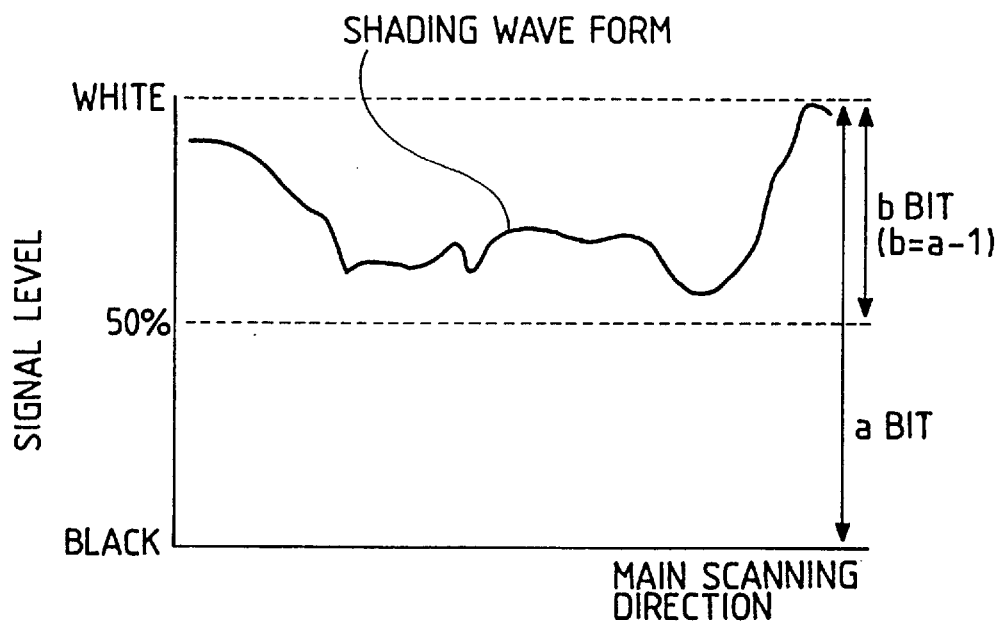
FIG. 5 is a diagram showing a reference wave form for shading correction according to the invention.

In the shading correction means 3, as shown in FIG. 4, means for compression and expansion of the white reference signal is provided, and the white reference signal is stored in the form of one pixel and one bit (d=1). A necessary condition for executing the shading correction exactly calls for dealing with the signal degradation due to compression and expansion of the white reference signal. In this case, as shown in FIG. 5, if distortion of the white reference signal is within 50% of the amplitude range with respect to white, the data width b of the reproduced white reference signal may be narrower than the inputted image signal (a=6) (a>b). For example, if the former is 6 bits, the latter may be 5 bits, and as a result of the shading correction, the correction signal of 6 bit width (c=6) can be obtained.

Figure 6:
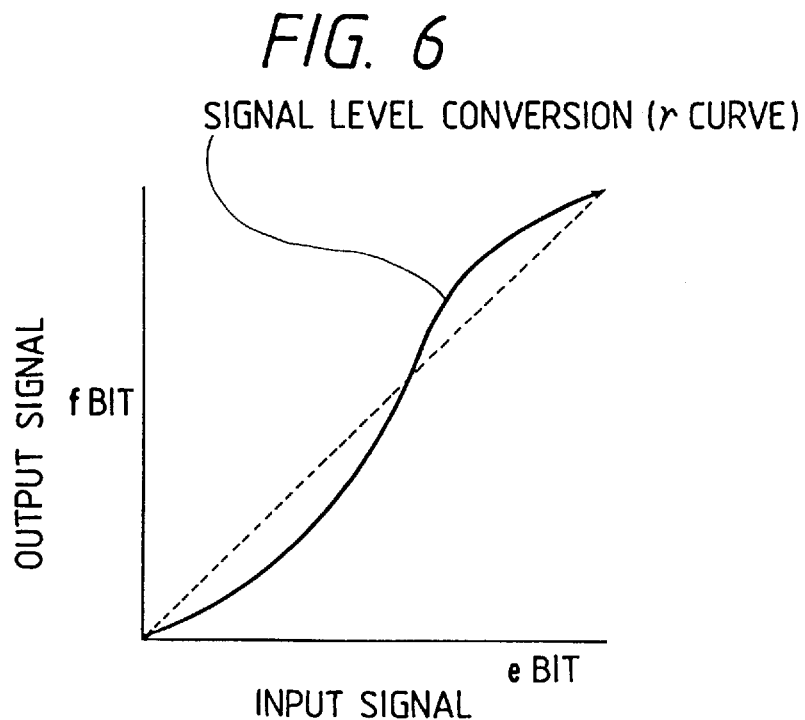
FIG. 6 is a diagram of a γ-conversion characteristic according to the invention.
Figure 7:
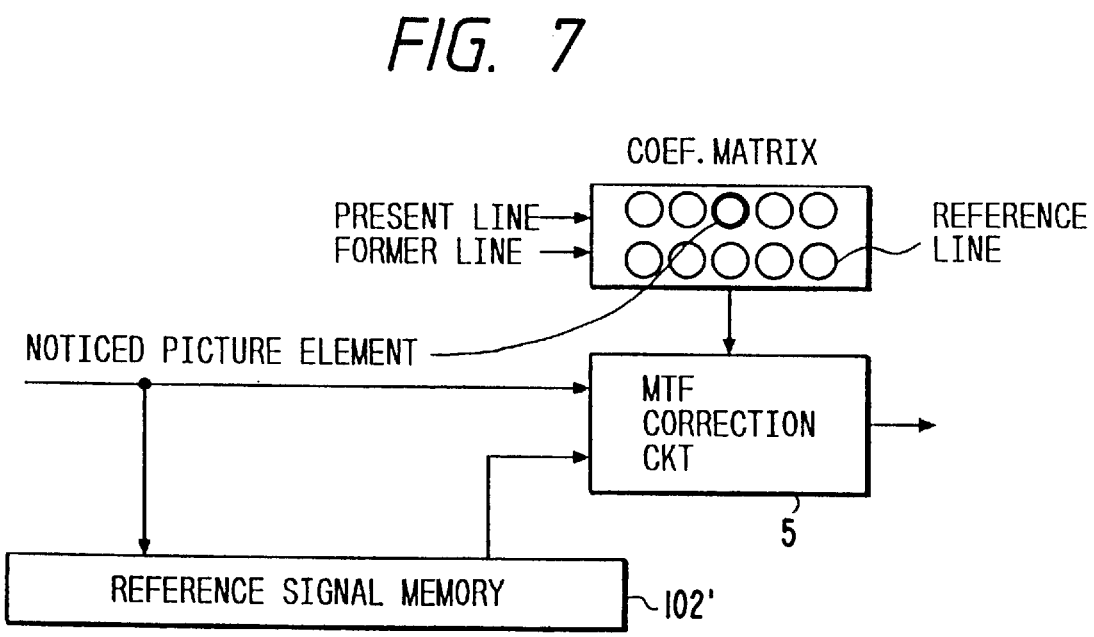
FIG. 7 is a block diagram of MTF correction means according to the invention.

In the MTF correction means, the filter treatment is executed in the object of the image signal after the γ-conversion by referring to the image signal of the former line. In this case, as shown in FIG. 6, in the y-conversion treatment, considering in the setting of the conversion curve, the output signal can be expressed by a data width f less than the data width e of the input signal (e>f). For example, if the former is 6 bits, the latter may be 5 bits, whereby the reference signal may be made to have a width less than 5 bits. As shown in FIG. 7, a memory corresponding to one line is prepared, and treatment using the coefficient matrix of 2×3 or 2×5 is executed with reference to data having a width of 5 bits of the former line.

Figure 8:
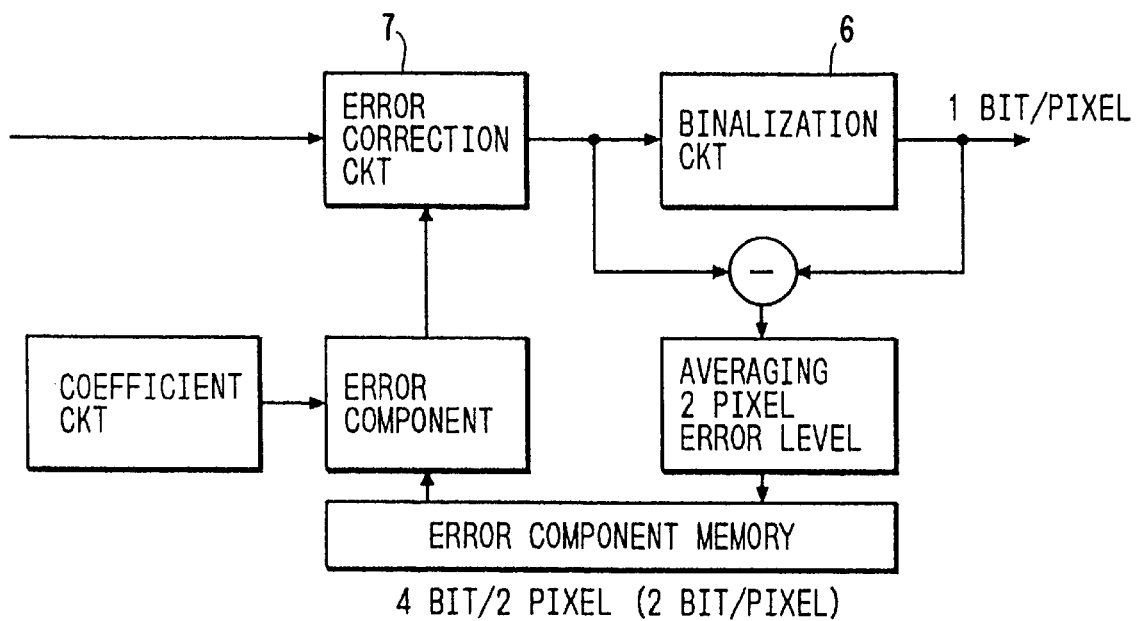
FIG. 8 is a block diagram of error diffusion means according to the invention.
Figure 9:
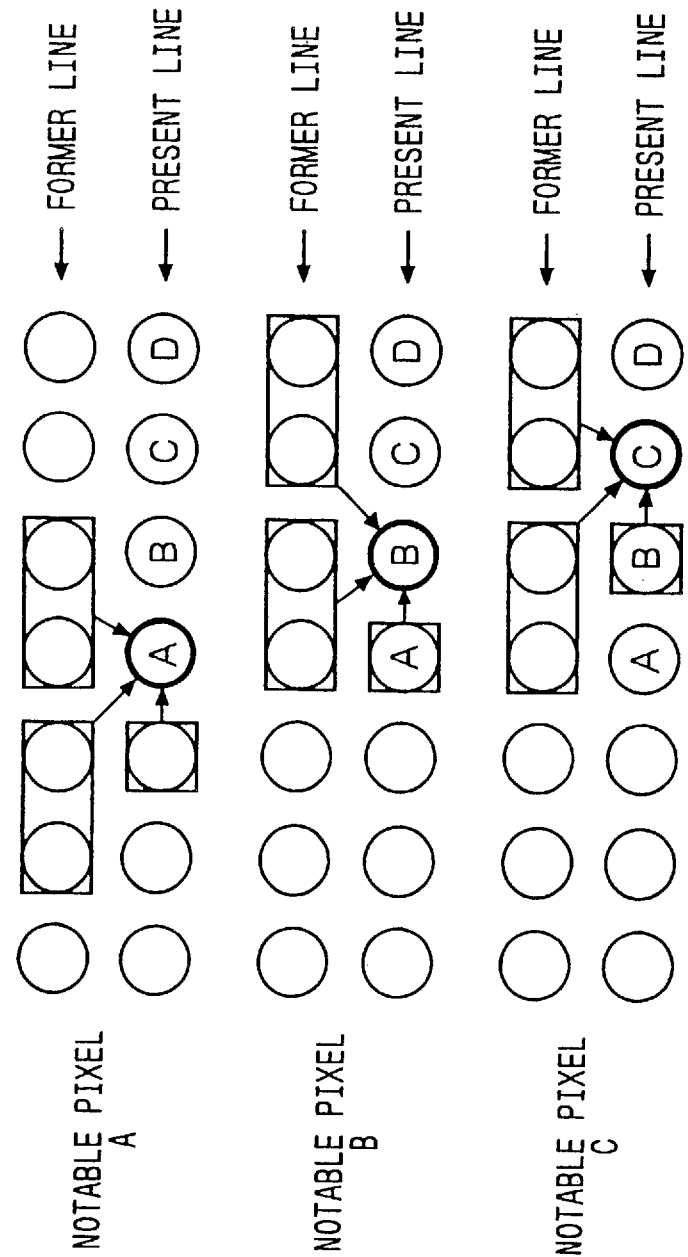
FIG. 9 is a diagram showing error diffusion treatment according to the invention.

In the error diffusion treatment, since the error components before and after the binarization in plural picture elements are subjected to weighted addition and fed back in sequence, unless the data width j of respective error components is made the same as the data width i of the image signal of the noticed picture element (made i>j), the density of the image on the whole situation is held. Also, in the error diffusion means, error components of the adjacent N picture elements are averaged and memories corresponding to the N picture elements store the error components, so the memory capacity required in the picture element unit can be reduced. Consequently, as shown in FIG. 8, after the error components are averaged by the adjacent two picture elements (N=2) and made into data of a 4-bit width (j=4), the data is stored as the memory in 2 bits per one pixel (j'=j/N). Reference to the error components stored in the memory is executed as shown in FIG. 9.

Figure 10:
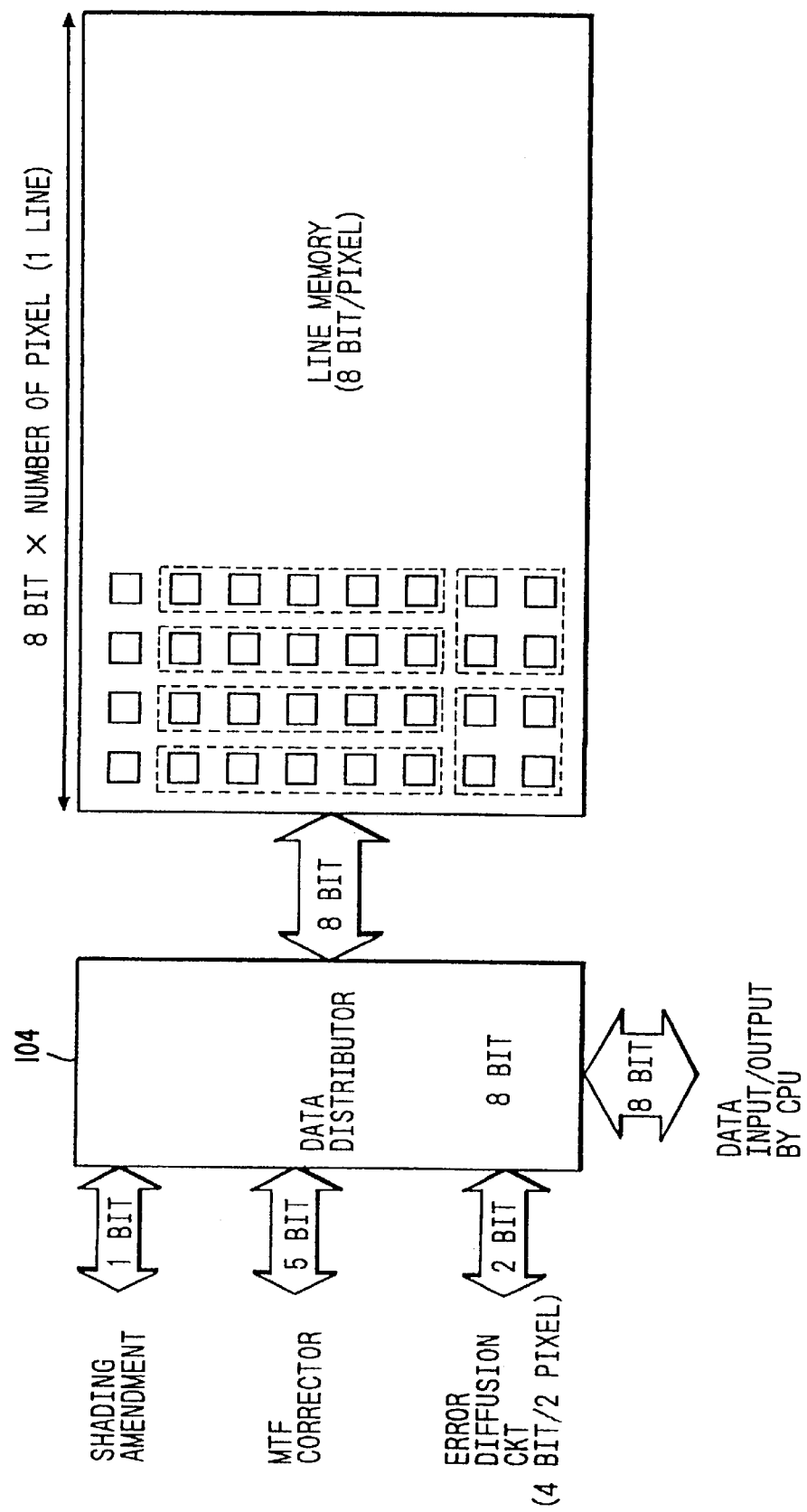
FIG. 10 is a block diagram of the data input/output according to a line memory of the invention.

Thus signals referred to in the signal treatments for shading correction, MTF correction and error diffusion are 8 bits per one pixel. As shown in FIG. 10, means for distributing data is used in each signal processing means, thereby a memory to carry out a data input/output operation of 8 bits by access at one time can be used. In general, memory constitution having a unit of 8-bits is widely used. Consequently, versatile and cheap memories of many types can be utilized, and simplification of the apparatus at a low price can be realized. The image processing circuit and the memory circuit can be easily assembled to the LSI.

When the line memory is constituted as an external circuit of the image processing means, a memory to carry out the data input/output operating in a unit of 8 bits is constituted in response to the number of picture elements per one line, and the memory capacity can be set. For example, when an original document of B4 size is read at 8 picture elements per 1 mm, since one line is constituted by 2048 picture elements, utilization of a memory of 2048 bytes is sufficient.

Not only respective signal processing means, but also data input/output means from a control apparatus (CPU or the like) to execute signal processing based on a program are provided, whereby the memory can have a further advantageous effect. For example, in order to set the white reference signal for shading correction, the image signal reading object in the white reference is inputted without performing the signal processing of the shading correction, the MTF correction and a error diffusion, and the signal procedure based on predetermined software is executed using the CPU, and then the calculated reference signal is written in the memory, whereby the shading correction can be executed using the white reference signal calculated by an arbitrary algorithm.

Using the image signal stored in the line memory, a decision concerning the signal property using the image signal in the domain constituted by plural picture elements can be carried out. As the domain decision means therefor, the signal treatment procedure fixedly set previously can be naturally used, and also the inputted image signal can be adaptively set using statistical means or learning means represented by a neurocomputer.

For example, a procedure to carry out a decision concerning the signal property using a neurocomputer is shown as follows.

(1) A circuit is set using a learning process of back propagation or the like (capable of being realized by software).

(2) An image signal in a minute domain constituted by plural picture elements is inputted to the circuit, and while the decision result is outputted, the picture plane is scanned in sequence.

(3) Using the decision result of the minute domain, a domain in a wider picture plane is divided and image signal processing suitable for respective divided domains is executed.

In this case, plural image signals to constitute the minute domain must be stored in a line memory or the like, and the line memory used in the above-mentioned signal processing means and its stored signal can be utilized. Therefore, a new memory need not be provided, and the signal processing for the decision of the signal property within the domain can be realized. This can be utilized for setting of a coefficient matrix of the MTF correction, setting of the diffusion coefficient of error component in the error diffusion, and further domain separation of the binary image and half-tone image.

The effects of the present invention are that the data width of signals referred to in respective signal C processings is reduced, and an image signal satisfying the accuracy of signal processing sufficiently and having a high picture quality can be obtained. For example, when the circuit is constituted by an LSI, the above-mentioned memory parts can be easily mounted on the same LSI. A memory required in the image signal processing can be made 8 bits per one pixel, and a cheap memory constitution can be utilized.

Thus, according to the present invention, the circuit constitution considering the whole image processing of a read signal can be realized in small scale and a high picture quality can be obtained.

What is claimed is:

1. An image signal processing apparatus comprising:
an image memory configured to store an image signal of plural picture elements inputted without performing shading correction, MTF correction and error diffusion;
white reference signal storing means, the image signal stored in the image memory being processed based on predetermined software and written in the white reference signal storing means for shading correction;
MTF correction means using MTF correction parameters;
error diffusion means using error diffusion parameters;
domain decision means for varying the MTF correction parameters and the error diffusion parameters and for outputting the state value representing the characteristics of the image signal stored in the image memory, thereby executing signal processing suitable for the image signal.

2. An image signal processing apparatus comprising:
a plurality of image signal processing means, each of said image signal processing means having an image signal processing function;
memory means for storing a plurality of data used in processing performed by said plurality of image signal processing means, each of the data corresponding to a respective one of said image signal processing means; and
data input-output control means accessible to the plurality of data for reading out the plurality of data from said memory means in a single accessing in advance of the execution of image signal processing, and for distributing the respective data in the plurality of data read out from said memory means in said single access to corresponding image signal processing means, whereby a plurality of image signal processing is executed using the plurality of data read out from said memory means in a single memory access.

3. An image signal processing apparatus as claimed in claim 2, wherein said memory means has a predetermined number of bits and the number of bits allocated respectively to each of the data corresponding to said plurality of image signal processing means is variable.

4. An image signal processing apparatus as claimed in claim 2, wherein said memory means has a predetermined number of bits and the number of bits allocated respectively to each of the data corresponding to said plurality of image signal processing means is variable, the number of bits allocated to each of said image signal processing means being different from each other.

5. An image signal processing apparatus as claimed in claim 2, wherein said plurality of image signal processing means, said memory means for storing a plurality of data, and said data input-output control means being formed on an one chip LSI.

6. An image signal processing apparatus as claimed in claim 2, wherein said image signal processing means has means for compressing and expanding an image signal.

7. An image signal processing apparatus as claimed in claim 2, further comprising data input/output means for transmitting data by said data input-output control means between an external control apparatus and said memory means.

8. An image signal processing apparatus as claimed in claim 2, wherein said plurality of image processing means are directly connected to each other without using said memory means.

9. An image signal processing apparatus as claimed in claim 2, wherein said image signal processing means has input means for inputting image signal.

10. An image signal processing apparatus comprising:
a plurality of image signal processing means, each of said image signal processing means having an image signal processing function which is different from the image signal processing function of the other image signal processing means;
memory means for storing a plurality of data used in processing performed by said plurality of image signal processing means, each of the data corresponding to a respective one of said image signal processing means; and
data input-output control means accessible to the plurality of data for reading out the plurality of data from said memory means in a single accessing in advance of the execution of image signal processing, and for distributing the respective data in the plurality of data read out from said memory means in said single access to corresponding image signal processing means, whereby a plurality of image signal processing is executed using the plurality of data read out from said memory means in a single memory access;

wherein said plurality of image signal processing means, said memory means for storing a plurality of data, and said data input-output control means being formed on an one chip LSI.

11. An image signal processing apparatus as claimed in claim 10, wherein said memory means has a predetermined number of bits and the number of bits allocated respectively to each of the data corresponding to said plurality of image signal processing means is changeable.

12. An image signal processing apparatus as claimed in claim 10, wherein said memory means has a predetermined number of bits and the number of bits allocated respectively to each of the data corresponding to said plurality of image signal processing mean is changeable, the number of bits allocated to each of said image signal processing means being different from each other.

13. An image signal processing apparatus as claimed in claim 10, wherein said image signal processing means has means for compressing and expanding image signal.

14. An image signal processing apparatus as claimed in claim 10, further comprising data input/output means for transmitting data by said data input-output control means between an external control apparatus and said memory means.

15. An image signal processing apparatus as claimed in claim 10, wherein said plurality of image processing means are directly connected to each other without using said memory means.

16. An image signal processing apparatus as claimed in claim 10, wherein said image signal processing means has input means for inputting image signal.

* * * * *